Feb. 21, 1928. Re. 16,886

O. WALKER

PRESSING IRON

Original Filed Aug. 4, 1922 2 Sheets-Sheet 1

WITNESSES

Inventor
Otto Walker Dec'd.
by The Eldec Co. Inc. Assignee
By
ATTORNEYS

Feb. 21, 1928. Re. 16,886

O. WALKER

PRESSING IRON

Original Filed Aug. 4, 1922 2 Sheets-Sheet 2

WITNESSES

Inventor
Otto Walker Dec'd
by The Eldec Co Inc. Assignee
BY
ATTORNEYS

Reissued Feb. 21, 1928. Re. 16,886

UNITED STATES PATENT OFFICE.

OTTO WALKER, DECEASED, LATE OF ZURICH, SWITZERLAND, BY THE ELDEC COMPANY, INC., OF NEW YORK, N. Y., ASSIGNEE.

PRESSING IRON.

Original No. 1,521,058, dated December 30, 1924, Serial No. 579,691, filed August 4, 1922. Application for reissue filed June 12, 1926. Serial No. 115,668.

The present invention relates to a new and improved flat or pressing iron and has for its main object the production of an electrically heated iron provided with means for generating steam and for supplying steam to the fabric which is being pressed.

Another object of the invention is to provide a flat iron of the class described which shall be simple, strong and compact and adapted to yield the highest desirable results in operation.

Other objects of the invention relate to the provision of minor parts and to details of construction, all of which will be more clearly set forth in the annexed specification.

With the above objects in view the invention resides in the parts and combinations of parts hereinafter described and particularly set forth in the appended claims.

In order that my invention may be clearly understood I have illustrated the same in the accompanying drawings, wherein:—

Figure 1:
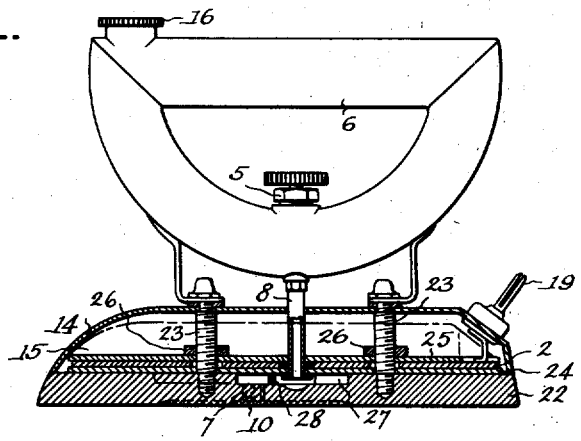
Fig. 1 shows an electrically heated flat iron in side elevation, parts being shown in section.
Figure 2:
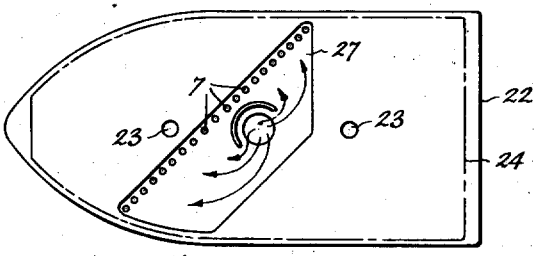
Fig. 2 is a plan view of the bottom or operating plate of the iron.

The iron shown in Figs. 1 and 2 comprises a bottom plate 22 into which two screw threaded bolts 23 are screwed. On the bottom plate 22 rests a sheet metal plate 24, and on said plate 24 an electric heating element 2 is arranged. The heating element 2 is held in position by a plate 25 and by nuts 26 screwed on said bolts 23. Above the bottom plate 22 a cover 14 is arranged which is firmly held by nuts on the bolts 23. A hollow handle 6 is fastened to the bolts 23. Said handle is adapted to receive the water to be vaporized. The handle 6 is provided with a filling-in screw 16 and with an adjustable needle valve 5 by means of which water passes from the handle 6 to a tube 8 in predetermined quantities according to the setting of the valve 5. The tube 8 passes through the plates 24, 25 and the electric heating element 2. The joints are rendered tight by soldering to prevent the access of water and steam to the element 2. The tube 8 ends above a recess 27 of the plate 22. From the said recess 27 bores 7 pass to the lower face of the bottom plate 22. The bores 7 are arranged at regular distances apart in a line at an oblique angle to the centre line of the operative face of the iron. The bores 7 end in a groove 10 by means of which the steam issuing from the nozzles 7 is equally distributed. Between the lower end of tube 8 and the bores 7 and within recess 27 a semi-circular ridge or baffle 28 is provided which prevents water from reaching the bores 7 before evaporation has taken place. As indicated by dotted lines a backing body 15 may be arranged on the plate 25. The electric heating element 2 is electrically connected to the studs 19 by well known means. The studs 19 are insulated and are adapted to receive a plug of known construction.

In operation the needle valve 5 is opened after the electric heating element has been connected to the current supply. The water passing into recess 27 is vaporized and the steam generated escapes through the bores 7 on to the fabric over which the iron is moved to and fro, the amount of steam applied being regulated by the needle valve 5.

Figure 3:
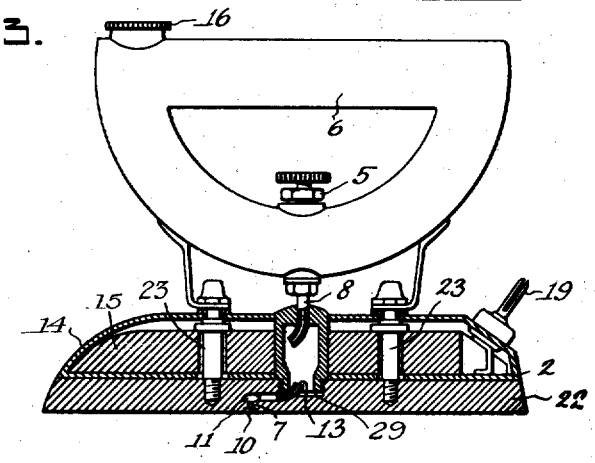
Fig. 3 shows a second form of construction of the flat iron in a side elevation and Fig. 4 shows the upper face of the bottom plate.
Figure 4:
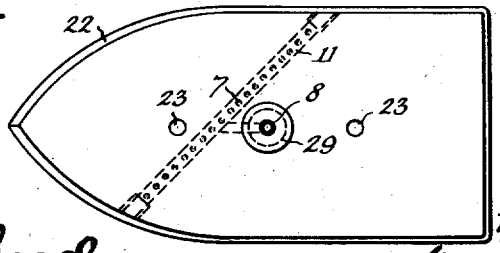

In the construction shown in Figs. 3 and 4 the tube 8 ends in a chamber 29 screwed into the bottom plate 22. From the chamber 29 in which the water is evaporated a tube 13 passes to a bore 11 and from the bore 11 a number of nozzles 7 lead to an oblique groove 10 in the working face of the plate 22. On the heating element 2 rests a backing body 15 which is firmly held by the bolts 23, on which the cover 14 and the handle 6 are fastened. The handle 6 which is a water container is provided with a needle valve 5 by means of which the flow of water and the steam produced may be regulated.

Figure 5:
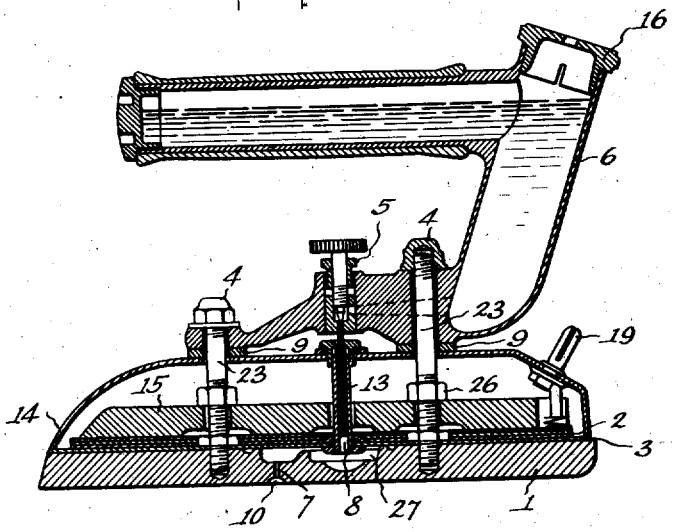
Fig. 5 is a sectional elevation of a third form of construction.
Figure 6:
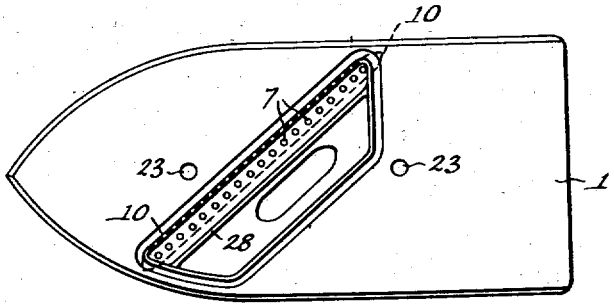
Fig. 6 shows the bottom plate from above.

The flat iron as shown in Figs. 5 and 6 comprises a bottom plate 1 on which a layer of insulating material 3 is placed. On the electric heating element 2 resting on said layer 3 a backing body 15 is arranged which is screwed down by nuts 26 on bolts 23. On the bolts 23 a cover 14 and a handle 6 are fastened by means of nuts 4. Heat insulating washers 9 are arranged between the cover 14 and the handle 6. The handle 6 forms a water container, and is provided with a filling-in screw 16 and with a needle valve 5 by means of which water from the handle 6 is fed to a tube 8 arranged within a larger tube 13. The latter is tightly fastened to the cover 14 and to the plate 3 and leads the water to a recess 27 in the top of the plate 1. From the recess 27 an oblique row of holes 7 lead to a groove 10 in the lower face of the plate 1. Between the holes 7 and the lower aperture of tube 13 a ridge or baffle 28 is provided which retains the water issuing from the tube 13 in the recess 27 to get it vaporized. The electric heating element 2 is electrically connected to the plug 19 in the well known manner.

In all the constructions shown the heat of the electric heating element is well applied and the water and steam have to pass the hottest part of the iron just before it leaves the nozzles 7. A perfect evaporation takes place and no water can possibly remain within the water ways and no rust is produced which might be carried off by the steam and soil the fabric. One of the important features of my invention is the forming of steam by the evaporation of the water directly in or on the bottom plate. As the water is led to the evaporation recess or chamber a small quantity at a time, the steam is formed rapidly, and uniformly, and furthermore it makes possible the use of a very small evaporation chamber, so that at no time can steam accumulate in dangerous quantities, and there is never present the possibility of an explosion in the iron with consequent injury to the operator or destruction of the device. Should the needle valve be opened to such an extent that more water would enter the evaporation chamber than could be evaporated, it would merely mean that heated water would escape through the bores 7.

To make more effective the functioning of the small and constricted evaporation chamber, I employ a rib 28 in the forms of the device shown in Figures 1, 2, 5 and 6, which prevents the direct flow of the water to the bore 7 and spreads the water out over the entire available, effective evaporating surface.

In all the constructions described above care is taken that no water or steam can pass on to the heating element 2 and if the valve 5 should leak the water passes off freely through the bores 7.

In all forms of my invention illustrated, it will be noted that the drip pipe for conveying water to the evaporating chamber is of relatively small diameter and does not contact with any wall of the chamber so that the water drips or falls from the end of the drip pipe into direct contact with the metal surface which is at the hottest part of the iron. The needle valve controlling the passage through this drip pipe permits of a fine adjustment so that just the proper amount of water may be dripped. This is of great importance for two reasons: first, an excess of water which cannot be vaporized will escape; and secondly, an excess of water tends to cool the iron. In a device of this character it is extremely desirable to utilize a heating element which does not require an excessive amount of current but only sufficient to give the required temperature to the iron. Furthermore, by dripping the water onto a hot metal surface it is instantly vaporized or converted into steam similarly as in flash boilers and there is no accumulation of water within the vaporizing chamber. Another important feature of the invention is the provision of a groove 10 in the lower face of the bottom plate of the iron with which all of the outlet orifices 7 communicate, so that these orifices cannot be cut off by contact with the goods being ironed, and also the groove permits the vapor to be evenly distributed throughout the face of the iron due to the groove which extends transversely and preferably diagonally of the iron.

I wish it well understood that I do not limit my invention to hand operated irons as my invention may be applied to ironing machines as well. Moreover the shape and arrangement of the water container may be made otherwise than as shown and described without departing from the invention.

What I wish to secure by Letters Patent is:

1. The combination of a flat iron, a cover thereon, an electrical heating element on the flat iron, a backing element on said heating element, a water reservoir forming a handle and having a valved duct arranged to discharge on the iron, the latter being provided with ducts leading to its face, and bolts detachably securing said iron, heating element, backing element, cover and reservoir handle together.

2. A pressing iron including a bottom plate having a vaporizing chamber directly associated with the upper face thereof, and having outlets formed in the bottom plate and communicating with the lower face of the bottom plate, a handle on the iron constituting a water reservoir, a drip pipe operatively connected to the reservoir, and terminating within the vaporizing chamber and spaced from the walls of said chamber, a ridge in the bottom of the vaporizing chamber between the end of said pipe and said outlets, and a needle valve controlling the flow through said drip pipe.

3. A pressing iron including a bottom plate having a restricted vaporizing chamber formed in the intermediate portion of its upper face, a main reservoir carried by the iron, a drip pipe connected with said reservoir and said chamber having its outlet end spaced from the walls of the vaporizing chamber, whereby liquid is dropped into the chamber, and a heating element on the bottom plate, said chamber having vapor outlets communicating with the lower face of the bottom plate.

4. A pressing iron, including a bottom plate, a heating element on the bottom plate, a water reservoir carried by the iron, said bottom plate having a vaporizing chamber therein, a drip pipe connecting the reservoir with said chamber, said iron having a groove in its lower face, a plurality of bores connecting the said groove with the vaporizing chamber, and a ridge in the vaporizing chamber acting as a baffle in the said vaporizing chamber and interposed between the discharge end of the drip pipe and the bores.

THE ELDEC CO. INC., [L. S.]
*Assignee of Otto Walker, Deceased.*
A. E. BONN, *Sec'y Treas.*